US012609121B2

(12) United States Patent
Last et al.

(10) Patent No.: US 12,609,121 B2
(45) Date of Patent: Apr. 21, 2026

(54) AUTOMATED SPEECH RECOGNITION TO SUPPORT CONTEXT-AWARE INTENT RECOGNITION

(71) Applicant: OAKSPIRE LTD, Dublin (IE)

(72) Inventors: Andrew Last, Dublin (IE); Jonathan Power, Dublin (IE)

(73) Assignee: OAKSPIRE LTD, Dublin (IE)

( * ) Notice: Subject to any disclaimer, the term of this patent is extended or adjusted under 35 U.S.C. 154(b) by 0 days.

(21) Appl. No.: 19/102,159

(22) PCT Filed: Aug. 8, 2023

(86) PCT No.: PCT/EP2023/071969
§ 371 (c)(1),
(2) Date: Feb. 7, 2025

(87) PCT Pub. No.: WO2024/033379
PCT Pub. Date: Feb. 15, 2024

(65) Prior Publication Data
US 2026/0011328 A1 Jan. 8, 2026

(30) Foreign Application Priority Data

Aug. 9, 2022 (GB) ..................................... 2211620

(51) Int. Cl.
*G10L 15/22* (2006.01)
*G10L 15/18* (2013.01)
*G10L 15/32* (2013.01)
(52) U.S. Cl.
CPC .......... *G10L 15/22* (2013.01); *G10L 15/1815* (2013.01); *G10L 15/32* (2013.01); *G10L 2015/223* (2013.01)

(58) Field of Classification Search
CPC ..... G10L 15/22; G10L 15/1815; G10L 15/32; G10L 2015/223
(Continued)

(56) References Cited

U.S. PATENT DOCUMENTS 10,418,033 B1 9/2019 Mutagi et al.
10,565,989 B1 * 2/2020 Wheeler ................. G06F 3/167
(Continued)

OTHER PUBLICATIONS

PCT International Search Report for PCT/EP2023/071969 mailed Nov. 27, 2023, 4 pages.
(Continued)

*Primary Examiner* — Thuykhanh Le
(74) *Attorney, Agent, or Firm* — Womble Bond Dickinson (US) LLP

(57) ABSTRACT

A computing system for determining a user intent from a speech input to effect a user intended action is provided. The computer system comprises a set of processing nodes and a controller module. Each processing node is capable of understanding only a subset of words directly relevant to a particular context. The processing nodes of the set are arranged to receive a same speech input, and each processing node attempts to interpret the input, based on its subset of words, to extract therefrom an output indicative of user intent. Each node is unable to interpret any portion of the input containing a word outside of its subset. The controller module receives the outputs from the set of processing nodes and determine a most likely user intent based on the outputs.

19 Claims, 9 Drawing Sheets

(58) Field of Classification Search
USPC ......................................................... 704/255
See application file for complete search history.

(56) References Cited

U.S. PATENT DOCUMENTS

| | | | | |
|---|---|---|---|---|
| 10,877,637 B1* | 12/2020 | Antos | ...................... | G06F 21/32 |
| 2002/0194000 A1* | 12/2002 | Bennett | .................. | G10L 15/32 |
| | | | | 704/E15.049 |
| 2004/0254791 A1* | 12/2004 | Coifman | ................. | G10L 15/26 |
| | | | | 704/E15.044 |
| 2006/0184354 A1* | 8/2006 | Huang | .................. | G10L 15/197 |
| | | | | 704/E15.024 |
| 2006/0224383 A1* | 10/2006 | Lee | ..................... | G10L 15/1815 |
| | | | | 704/E15.024 |
| 2008/0077386 A1* | 3/2008 | Gao | ........................ | G06F 40/40 |
| | | | | 704/E15.04 |
| 2008/0133244 A1* | 6/2008 | Bodin | ..................... | G10L 15/22 |
| | | | | 704/E15.04 |
| 2010/0004930 A1* | 1/2010 | Strope | ..................... | G10L 15/01 |
| | | | | 704/251 |
| 2010/0121638 A1* | 5/2010 | Pinson | ................... | G10L 15/02 |
| | | | | 704/235 |
| 2010/0256978 A1* | 10/2010 | Rosenbaum | .......... | G06F 18/256 |
| | | | | 704/E15.005 |
| 2010/0268536 A1* | 10/2010 | Suendermann | ........ | G10L 15/22 |
| | | | | 704/E15.008 |
| 2011/0144999 A1* | 6/2011 | Jang | ........................ | G06V 40/70 |
| | | | | 704/270.1 |
| 2011/0161077 A1* | 6/2011 | Bielby | ................... | G10L 15/32 |
| | | | | 704/E15.001 |
| 2011/0213611 A1* | 9/2011 | Rauh | ......................... | B07C 3/10 |
| | | | | 704/233 |
| 2011/0301952 A1* | 12/2011 | Koshinaka | ............. | G10L 15/32 |
| | | | | 704/235 |
| 2011/0307250 A1* | 12/2011 | Sims | ........................ | G10L 15/22 |
| | | | | 704/E21.001 |
| 2012/0084086 A1* | 4/2012 | Gilbert | ................... | G10L 15/26 |
| | | | | 704/235 |
| 2012/0215539 A1* | 8/2012 | Juneja | .................. | G10L 15/193 |
| | | | | 704/E15.005 |
| 2012/0253799 A1* | 10/2012 | Bangalore | ............. | G10L 15/183 |
| | | | | 704/E15.001 |
| 2013/0289996 A1* | 10/2013 | Fry | ......................... | G10L 15/32 |
| | | | | 704/E15.018 |
| 2014/0025380 A1* | 1/2014 | Koch | ...................... | G10L 15/30 |
| | | | | 704/E15.005 |
| 2015/0012271 A1* | 1/2015 | Peng | ...................... | G10L 15/08 |
| | | | | 704/235 |
| 2015/0032453 A1* | 1/2015 | Hoarty | ................... | G10L 15/14 |
| | | | | 704/254 |
| 2015/0058018 A1* | 2/2015 | Georges | ................. | G10L 15/08 |
| | | | | 704/257 |
| 2015/0106085 A1* | 4/2015 | Lindahl | ................... | G10L 15/32 |
| | | | | 704/231 |
| 2015/0221308 A1* | 8/2015 | Suzuki | ................... | G10L 17/22 |
| | | | | 704/251 |
| 2015/0314454 A1* | 11/2015 | Breazeal | ............... | G10L 15/32 |
| | | | | 700/259 |
| 2015/0378671 A1* | 12/2015 | Grobauer | ............... | G10L 15/22 |
| | | | | 704/275 |
| 2017/0206064 A1* | 7/2017 | Breazeal | ................. | G06F 8/36 |
| 2018/0096678 A1* | 4/2018 | Zhou | ...................... | G10L 15/08 |
| 2018/0211669 A1* | 7/2018 | Corcoran | ............... | G10L 15/32 |
| 2018/0314689 A1* | 11/2018 | Wang | ................. | G10L 15/1822 |
| 2019/0066670 A1* | 2/2019 | White | .................... | G10L 15/22 |
| 2019/0251970 A1* | 8/2019 | Shukla | .................. | G10L 15/25 |
| 2019/0279642 A1* | 9/2019 | Shukla | .................. | G10L 15/30 |
| 2019/0287533 A1* | 9/2019 | Homma | ................. | G10L 15/10 |
| 2019/0304450 A1* | 10/2019 | Kwon | ..................... | G10L 15/26 |
| 2019/0371318 A1* | 12/2019 | Shukla | ................. | G10L 15/083 |
| 2020/0126565 A1* | 4/2020 | Kim | ........................ | G10L 15/22 |
| 2020/0193984 A1* | 6/2020 | Lee | ...................... | B60K 35/265 |
| 2020/0193985 A1* | 6/2020 | Lee | ......................... | G10L 15/22 |
| 2020/0258505 A1* | 8/2020 | Sambarino | ............ | G10L 15/183 |
| 2020/0342853 A1* | 10/2020 | Ji | ............................ | G10L 15/02 |
| 2020/0357412 A1* | 11/2020 | Robert Jose | ........ | G10L 15/1815 |
| 2020/0388282 A1* | 12/2020 | Secker-Walker | ....... | G10L 15/22 |
| 2021/0012765 A1* | 1/2021 | Weisz | ................. | G10L 15/1815 |
| 2021/0118437 A1* | 4/2021 | Kim | ........................ | G10L 15/22 |
| 2021/0133583 A1* | 5/2021 | Chetlur | .................. | G06N 3/084 |
| 2021/0151042 A1* | 5/2021 | Park | ..................... | G06F 40/295 |
| 2022/0036882 A1* | 2/2022 | Ahn | ........................ | G06F 9/547 |
| 2022/0108699 A1* | 4/2022 | Amakasu | ............. | G06F 16/245 |
| 2022/0270595 A1* | 8/2022 | Kroehl | ................. | G10L 15/142 |
| 2022/0319511 A1* | 10/2022 | Lee | ......................... | G10L 15/07 |
| 2023/0053765 A1* | 2/2023 | He | ................... | H04N 21/42204 |
| 2023/0086579 A1* | 3/2023 | Kim | ........................ | G06F 3/167 |
| | | | | 704/246 |
| 2023/0122941 A1* | 4/2023 | Biadsy | ................... | G10L 15/32 |
| | | | | 704/257 |
| 2024/0036712 A1* | 2/2024 | Antos | ................. | G06F 3/04883 |

OTHER PUBLICATIONS

PCT Written Opinion of the International Searching Authority for PCT/EP/2023/071969 mailed Nov. 27, 2023, 9 pages.

* cited by examiner

220

S222 — Receive speech input

S224 — Each node processes input to generate confidence score

S226 — Define dynamic node lexicon

S228 — Dynamic node processes input to generate comparable confidence scores

S230 — Determine user intent based on comparable confidence scores

S232 — Action determined user intent

AUTOMATED SPEECH RECOGNITION TO SUPPORT CONTEXT-AWARE INTENT RECOGNITION

CROSS-REFERENCE TO RELATED APPLICATIONS

This application is a national stage of International Application No. PCT/EP2023/071969, filed on Aug. 8, 2023, which claims priority to GB Patent Application No. 2211620.6, filed on Aug. 9, 2022. Both of the aforementioned applications are hereby incorporated by reference in their entireties.

TECHNICAL FIELD

The present disclosure generally relates to automated speech recognition (ASR). More particularly, the present disclosure concerns a form of ASR designed to support context-aware intent recognition on spoken inputs. Such intent recognition may be used to effect a form of voice user interface (VUI), whereby a user may interact with a computer system to cause the computer system to perform desired actions through spoken instructions.

BACKGROUND

Different forms of intent recognition have been implemented in various context. One such context is online 'chatbots', which are becoming more prevalent. For the most part, conventional chatbots are based on text rather than voice input. Typically, a user interfaces with a chatbot through text input typed on a physical or virtual keyboard or provided via some other text input mechanism at their device. Typically, the inputs to the chatbot are 'unstructured' natural language in the sense of 'free form' text that must be interpreted using trained models and the like. A natural language input may be provided to a machine learning model that has been trained to perform an intent recognition task, and which processes the natural language input into a structured, computer-interpretable command based on intent classification. The training data would typically comprise a set of example 'utterances' (natural language phrases known or assumed to express a given intent), at least some of which might be tagged with 'slots', which is another name for variables; for example, the utterance 'I want a reservation for two people at 12.30' might be classified as a 'CreateReservation' intent with slots (variables) 'People=2' and 'Time=12.30 PM', allowing the intent recognition model to generate, from the unstructured input, a structured command CreateReservation (2, 12.30 PM) that can be executed within the computer system.

When it comes to voice input, such interfaces may be straightforwardly extended to voice input with the addition of conventional automated speech recognition. This would typically involve a 'speech-to-text' translation process that receives audio data capturing a spoken instruction, and attempts to transcribe the spoken instruction verbatim. The resulting text string can, in turn, be as a natural language text input in exactly the same manner as a text input that has been typed by a user. Examples of such voice-based interfaces include 'digital assistants' of the kind found on many modern smartphones and other 'smart' devices. Modern voice interfaces typically utilize this two-stage process of speech recognition followed by intent recognition.

ASR engines may operate in various stages. One form of ASR applies an acoustic model to an audio signal, to extract a sequence of speech phonemes (or multiple candidate sequences) therefrom. This may be enhanced by other forms of processing, such as noise and/or silence detection. A lexicon is then used to determine possible word sequences from the phoneme sequence, typically on a 'per-word' basis. A lexicon maps phoneme combinations to a vocabulary of known words. Certain words may have multiple pronunciations, and certain phoneme sequences might be ambiguous, so the mappings are not necessarily one-to-one. A language model may then be used to determine a most probable word sequence from the candidate word sequences, taking into account relationships between words in the sequence.

SUMMARY

In a conventional voice user interface, the overall capabilities and performance ability of the system is dependent on two factors: the automated speech recognition process, and the intent recognition model applied to the ASR output. Regarding the former, if the ASR process fails to transcribe the user's speech accurately, this may cause the intent recognition process to fail. Regarding the latter, the intent recognition process is generally limited by the size and scope of its training set, and also the set of intent classes (and slots/variables) on which it has been trained. To improve overall the overall capability or performance, the conventional approach would be to extend the capabilities of the ASR system, with the aim of reducing failure cases to a minimum. This might, for example, involve collecting and analysing failure cases, extending the vocabulary/lexicon, refining the language model (e.g. through re-training), or any combination thereof; the theory being that, if the ASR system can accurately transcribe more or less any form of spoken input, it will be able to provide an accurate text transcription to the intent recognition model in more or less any situation. Similarly, in such an approach, the capabilities or performance of the intent recognition process might be expanded by expanding the training set of user utterances; the theory being that, in so doing, the intent recognition model would be able to recognize a given intent, however it is expressed in words, assuming those words have been transcribed accurately.

This conventional approach has various drawbacks. There are practical limits on the performance and capabilities of both ASR and intent recognition models. For example, in practice, the vocabulary of an ASR engine can likely only be expanded to a certain point before its performance starts to degrade. Another drawback is that this approach typically requires large quantities of training data—for both the ASR engine and the intent recognition model—and significant effort to tune and refine the system (e.g., through re-training).

Herein, a different approach is taken. A 'node' herein is a processing component that receives a voice input and attempts to extract a user intent therefrom. However, a single node is only designed to recognize user intent within a narrow context. To this end, a single node has intentionally-limited speech recognition capabilities, whereby a node is only capable of understanding only a small (and potentially tiny) subset of spoken language relevant to its narrow context. The aim is not to provide an accurate transcript of any speech the node might encounter; its only aim is to understand the intent expressed in any portion or portions of the spoken input that are relevant to its narrow context. If the node receives a speech input that does not relate to its narrow context, the node's intent recognition will fail.

To build a system that is capable of handling a wider range of contexts, rather than attempting to expand the capabilities of an individual node, multiple such nodes, targeted on different narrow contexts, are deployed in parallel. When a speech input is received, the speech input is provided to each node for processing in parallel with each other node. Each node attempts to interpret the voice input and extract a user intent therefrom; in a typical scenario, only one node will be able to do so.

In this arrangement, 'failure' may be assessed in relative terms across a group of nodes. For example, whichever node is most confident in its final output 'succeeds' on the voice input, and all other node(s) are deemed to fail. In such embodiments, note that relative confidence between the nodes is germane. For example, consider a speech input that contains a short section that is relevant to a given context, but also a lengthy superfluous portion that is not relevant to the narrow context of any node; none of the nodes will be able to understand the lengthy superfluous section, and that might in turn reduce the confidence of each node in its final output; however, the node designed to handle the given context will be able to understand the short section relevant to that context, giving it an overall confidence in its output that might be low in absolute terms but nonetheless higher than any other node.

The methods and systems herein provide improved speed and precision for a class of automated speech recognition task, specifically intent recognition applied to speech inputs where the user's intent is expressed through speech in one of a number of defined speech recognition contexts. This is achieved through a context-aware speech processing architecture, without placing additional burden on the end-user.

A first aspect herein is directed to a computer system comprising: an input configured to receive a speech input; a first processing node configured to attempt to interpret the speech signal based on a first lexicon, in order to extract a first output indicative of user intent and a first confidence denoting an extent to which the first processing node was able to interpret the speech input; and; a second processing node configured to attempt to interpret the speech signal based on a second lexicon in order to extract a second output indicative of user intent and a second confidence score denoting an extent to which the second processing node was able to interpret the speech input, wherein the first lexicon contains at least one word not contained in the second lexicon; and a controller configured to determine a user intent associated with the speech input based on the first output, the first confidence score, the second output and the second confidence score.

According to a second aspect, there is provided herein a computing system for determining a user intent from a speech input to effect a user intended action, the computer system comprising: a set of processing nodes, wherein each processing node is capable of understanding only a subset of words directly relevant to a particular context associated with that processing node, the processing nodes of the set being arranged to receive a same speech input, wherein each processing node is configured to attempt to interpret the same speech input based on the subset of words directly relevant to its associated context, to extract therefrom an output indicative of user intent, whereby each processing node is unable to interpret any portion of the same speech input containing a word outside of its subset of words, whereby a portion of the same speech input relating to the particular context of a first of the nodes is interpretable to the first processing node but is not interpretable to a second of the processing nodes; and a controller module configured to receive the outputs from the set of processing nodes and determine a most likely user intent based on the outputs.

In some embodiments, the output generated by each processing node may comprise a confidence score denoting an extent to which the processing node was able to interpret the speech input, and thus conveying an expected relevance of the node's associated context to the said same speech input.

In some embodiments, each node may comprise: an automated speech recognition component configured to generate a speech recognition result from said same speech input based on the subset of words understood by that processing node, and an intent recognition component configured to generate the output indicative of user intent based on the speech recognition result, wherein the speech recognition output is restricted to only any portion or portions of said same speech input that the automated speech recognition component was able to interpret.

In some embodiments, the confidence score may depend on: the proportion of the speech input that the automated speech recognition component was not able to interpret, and a confidence of the automated speech recognition component in its interpretation of any portion that it was able to interpret.

In some embodiments, the subset of nodes may be contained in a configurable lexicon of the automated speech recognition component.

In some embodiments, the controller module may be configured to determine the most likely user intent by determining a significant confidence score of the received confidence scores.

In some embodiments, the controller module may be configured to determine the significant confidence score based on the statistical significance of the received confidence scores.

In some embodiments, the controller module may be further configured to: identify a segment of the user input associated with the significant confidence score; remove the segment from the user input to generate a reduced user input; provide the reduced user input to the set of processing nodes; receive, from each of the processing nodes of the set of processing nodes, a second output generated by processing the reduced user input using the processing nodes; determining the user intent based on the outputs and the second outputs.

In some embodiments, the controller module may be further configured to: identify a second significant confidence score received from a second of the set of processing nodes; determine that the significant confidence score and the second significant confidence score are associated with a same segment of the user input; determine, based on a determined grammar of the user input, the most likely user intent, wherein the most likely user intent corresponds to a more likely determined grammar of the outputs comprises the significant confidence score and the second significant confidence score.

In some embodiments, the system may further comprise: a plurality of sets of processing nodes; and a plurality of instances of the controller module, wherein each instance of the controller module is associated with one of the sets of processing nodes; wherein each controller module is configured to receive outputs from each of the processing nodes of the associated set of processing node.

In some embodiments, each instance of the controller module may comprise a respective input, wherein each instance of the controller module is configured to: receive a respective user input; and provide the respective user input to the set of processing nodes associated with the controller module.

In some embodiments, the system may further comprise a central controller configured to: receive and store in computer memory current contextual data associated with the context; build a language library based on the current contextual data; compile an updated processing node associated with the context based on the language library; and deploy the updated processing node at one of the set of processing nodes.

In some embodiments, at least a portion of the current contextual data may be substantially the same as a portion of historic contextual data, wherein the language library is based on user inputs received associated with the portion of historic contextual data.

In some embodiments, the central controller may be configured to retire a former processing node associated with the context which is replaced by the updated processing node.

In some embodiments, the central controller may be configured to compile and deploy the updated processing node periodically.

In some embodiments, the controller module may be further configured to: determine an action based on the user intent; and provide instructions which, when executed, cause the action to be implemented.

In some embodiments, the controller module may be associated with a service system, wherein the controller module is executed on a computing device of the service system.

In some embodiments, each processing node may be executed by a remote server or a virtual machine.

According to a third aspect, there is provided a computer-implemented method for determining a user intent from a speech input to effect a user intended action, the method comprising: receiving, at a set of processing nodes, a same speech input, wherein each processing node is capable of understanding only a subset of words directly relevant to a particular context associated with that processing node; attempting to interpret, by each processing node, the same speech input based on the subset of words directly relevant to its associated context, to extract therefrom an output indicative of user intent, whereby each processing node is unable to interpret any portion of the same speech input containing a word outside of its subset of words, whereby a portion of the same speech input relating to the particular context of a first of the nodes is interpretable to the first processing node but is not interpretable to a second of the processing nodes; receiving, at a controller module, the outputs from the set of processing nodes; and determining, by the controller module, a most likely user intent based on the outputs.

According to a fourth aspect, there is provided herein a processing node of a computing system for determining a user intent from a speech input to effect a user intended action, wherein the processing node is capable of understanding only a subset of words directly relevant to a particular context associated with the processing node, wherein the processing node is configured to attempt to interpret the speech input based on the subset of words directly relevant to the associated context, to extract therefrom an output indicative of user intent, whereby each processing node is unable to interpret any portion of the same speech input containing a word outside of its subset of words, wherein the processing node comprises: a voice-to-text component for generating a text string from the spoken user input, wherein the voice-to-text component is associated with a context lexicon comprising the subset of words directly relevant to the associated context, wherein the text string comprises only words comprised in the subset of words directly relevant to its associated context; and an intent recognition component configured to receive the text string and determine a contextual intent based on the text string and the context lexicon.

In some embodiments, each processing node of the above mentioned computing systems is a processing node as set out above.

The system provided herein is particularly well suited to focussed intent recognition tasks, but applied over a potentially wide range of contexts. In this sense, the system is highly scalable (and adaptable), in that it can accommodate new contexts (and adapt existing contexts), simply by deploying additional processing nodes (and adapting the lexicons of existing processing nodes, and decommissioning nodes as contexts shift or become irrelevant).

For example, in embodiments, a node's capability may be implemented using an ASR engine but with a highly restricted lexicon/vocabulary that defined the node's narrow context. In a parallel architecture, each node may for example have the same processing capabilities, but be equipped with a different lexicon/vocabulary. From a conventional perspective, the ASR engine will perform poorly on a speech input (or a portion of speech input) that does not relate to its narrow context. The ASR engine can be configured to provide an ASR output that is restricted to any portion or portions of the speech input on which it is sufficiently confident (for example, words with a confidence score below a threshold may be removed from the final output, or if an ASR engine has the ability to explicitly recognise the presence of unknown words, such unknown words may be filtered-out). Because the lexicon/vocabulary has been intentionally restricted, there will generally be a significantly higher proportion of unknown or low confidence words than in a conventional ASR application; this is a deliberate choice, as the effect is to filter-out superfluous words that are not relevant to the nodes narrow context. If the speech input is entirely irrelevant to the nodes' narrow context, it may be that the final ASR output contains no words at all.

An intent recognition model may then be used to extract a user intent (e.g. an intent class and/or one or more intent variables) associated with the node's narrow context from the final ASR output. If the node receives a voice input that does not relate to its narrow context, the node's ASR process will fail, as will its intent recognition capability. Because the ASR output is already highly focused on the node's narrow context, a relatively 'lightweight' form of intent recognition can be used (in contrast to more conventional applications of intent recognition, the intent recognition model is no longer responsible for extracting user intent from potentially verbose utterances, as the final ASR output is now highly focussed).

The input configured to receive the speech input may, for example, take the form of a network interface configured to receive a message (or messages) carrying the speech input from a remote device, such as a user device, where it has been captured using a microphone or other audio capture device. Alternatively, the input may take the form of an audio capture device (e.g. microphone), where the processing nodes are implemented locally at the device at which the speech input is captured.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 6 is a schematic diagram of a processing node.

DETAILED DESCRIPTION

Figure 1:
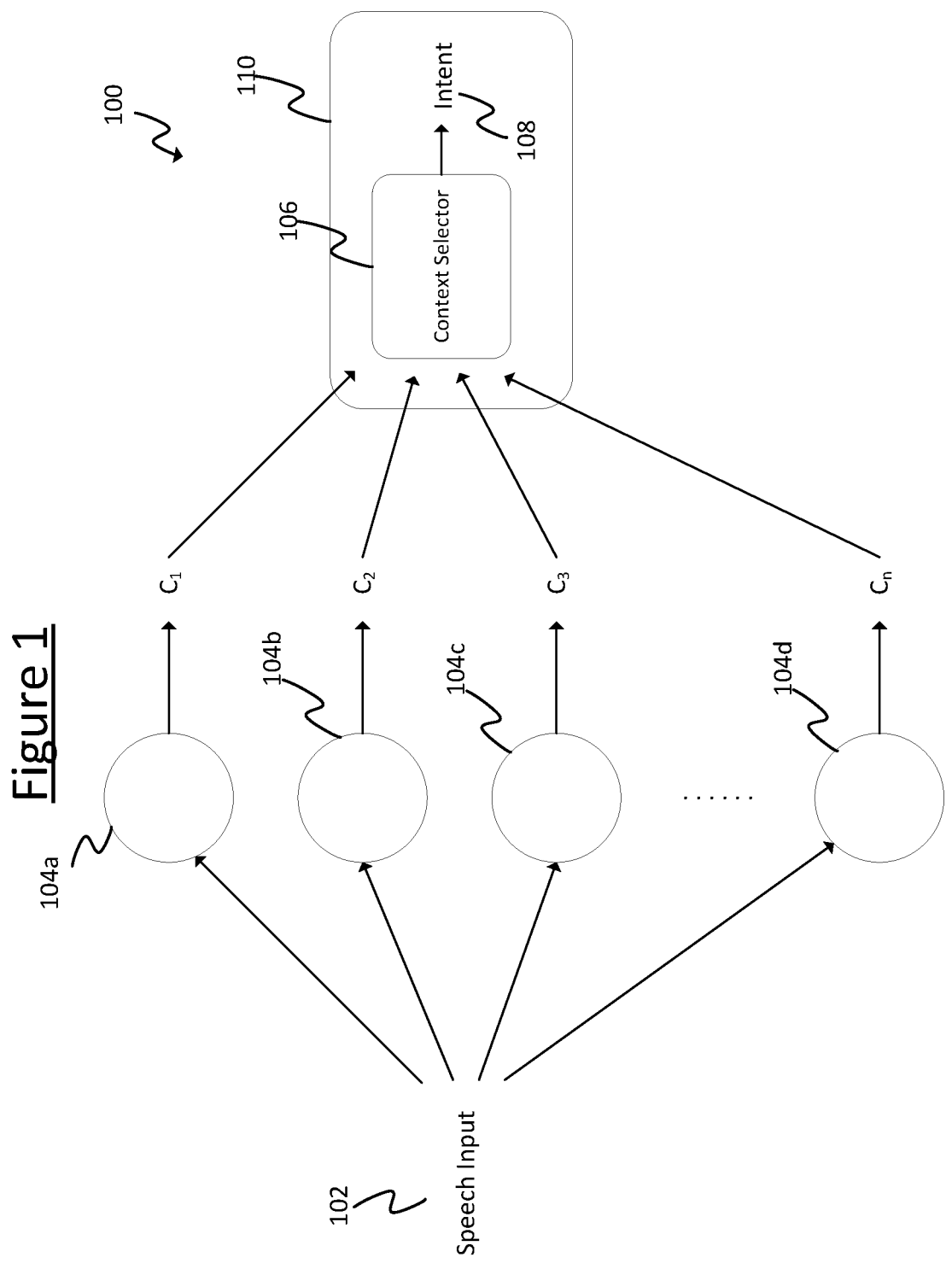
FIG. 1 provides an example intent recognition system.

FIG. 1 shows an example intent recognition system 100 comprising a plurality of nodes 104 and a context selector 106. The intent recognition system 100 is a computer system comprising one or more computer devices.

Multiple of nodes 104a, . . . , 104d are implemented within the system 100. In the described examples, the nodes operate in parallel. Parallel processing can be implemented in various ways, e.g. at the hardware or operating system level. For example, two nodes running in parallel on the same computing device may be implemented as separate processes or threads (on the same processor or processor core, or on different processors or processor cores). As another example, two nodes might run in parallel on different virtual or physical devices.

Within the intent recognition system 100, intent recognition software is stored and is configurable with a library. A node 104 is implemented, in the described embodiments, as an instance of a software program comprising a voice-to-text component and the intent recognition software together with a specifically assigned language library, or lexicon, defining the vocabulary associated with a context.

Each node 104 may therefore be tuned to a specific, narrow context, by intentionally restricting the lexicon to a highly targeted subset of words (far smaller than would be used in a conventional ASR application). As such, each node 104 is only configured to recognise and extract a small, targeted, subset of the natural language input and disregard the rest of the information provided in the input. Outside of this narrow subset of language, speech is meaningless to the node, and it will be unable to interpret it.

The nodes 104 are trained and continuously recompiled with respect to their context, with context evolving over time. That is to say, there may be an initial training phase (or configuration phase more generally) in which the node capability is engineered.

"Recompiling" refers to the subsequent selection of an appropriate set of words to be included in the lexicon.

Highly contextualised nodes are built (and, in some cases, rebuilt) to understand spoken instructions within these very narrow lanes of context. Anything from outside this lane that is spoken is not understood by the node 104 and so is ignored. These nodes are combined into an array of nodes to cover a broad application context, for example betting. For example, in a betting context, each node might be associated with a specific sporting or other event (one example of a narrow context), and the lexicon might include entities (such as players or horse names, unique to a given node) involved in the event, as well as a number of key words or phrases uses in a betting context (some of which may be universal or apply across multiple nodes, e.g. all nodes relating to football or horse race event). Note that a targeted lexicon may therefore include a subset of words unique to a single context, in addition to a small number of words common to multiple nodes. The total number of words is relatively small in any event. Note that a 'word' refers to an atomic unit of speech as defined in the lexicon (which could be a single word in the everyday sense, but also a short phrase).

By streaming spoken instructions to all nodes associated with the broad context, it can be expected that just one node will understand the instruction in most practical situations.

An alternative would be to try to ascertain an applicable context, through the selection of menu options. That would require the user to go through various menu options, in order to navigate a decision tree, before they are able to express their desired intent. The menu options would, in that case, be used to narrow the context, to allow the user's speech input to be interpreted by an appropriate component. The system 100 avoids this, by providing the speech input to multiple nodes, and generating a final output based on the node that is able to understand the instruction.

The described system is not a dialog system; the expectation is that a single speech input will contain all the information needs to determine an intent and all of its relevant variable(s) (such as entity, bet amount etc.).

One application considered herein is "transactional" intent recognition. In a transactional context, people's use of language narrows markedly, and typically becomes more focussed and precise. A transactional intent may, for example, be a spoken instruction to place a bet, where a single spoken instruction defines all of the necessary information for the transaction to be implemented. In a betting context, there is a relatively high degree of uniformity and precision in the language typically used to place bets. The language library used for each node 104 can therefore be highly targeted to very small subset of language that can sustain understanding within a very narrow 'lane' of context, without impacting on intent recognition performance. Indeed, in such contexts, restricting the lexicon in this way can significantly improve performance, because there is far less scope for error or ambiguity when a node received a speech input within a narrow context (if a node is able to interpret a portion of a speech input at all, then there is a likelihood that its interpretation will be correct).

It will be appreciated that the betting example is merely illustrative. More generally, the system 100 is particularly well suited to any context in which users are expected to have a clear, and clearly expressed, intent (in contrast to more open-ended question-answer exchanges and the like).

FIG. 1 shows four nodes 104a, 104b, 104c, 104d, however it will be appreciated that the number of nodes 104 may vary and is dependent on the number of contexts the intent recognition system 100 is to be used for. For example, the number of nodes 104 may have an order of magnitude of 100 or higher. In some embodiments, the number of nodes 104 and the specific nodes 104 deployed may change over time, as discussed later.

Each node 104 is configured to identify a contextual intent from the user input associated with the context for which it is trained. That is, a specific action the user intends to be implemented by providing their input. As each node 104 is only used to identify certain types of intent, the nodes 104 are trained to recognise a very narrow subset of language, specific to the context, and are able to ignore any portions of the input which are not associated with the possible contextual intents of the context.

Figure 6:
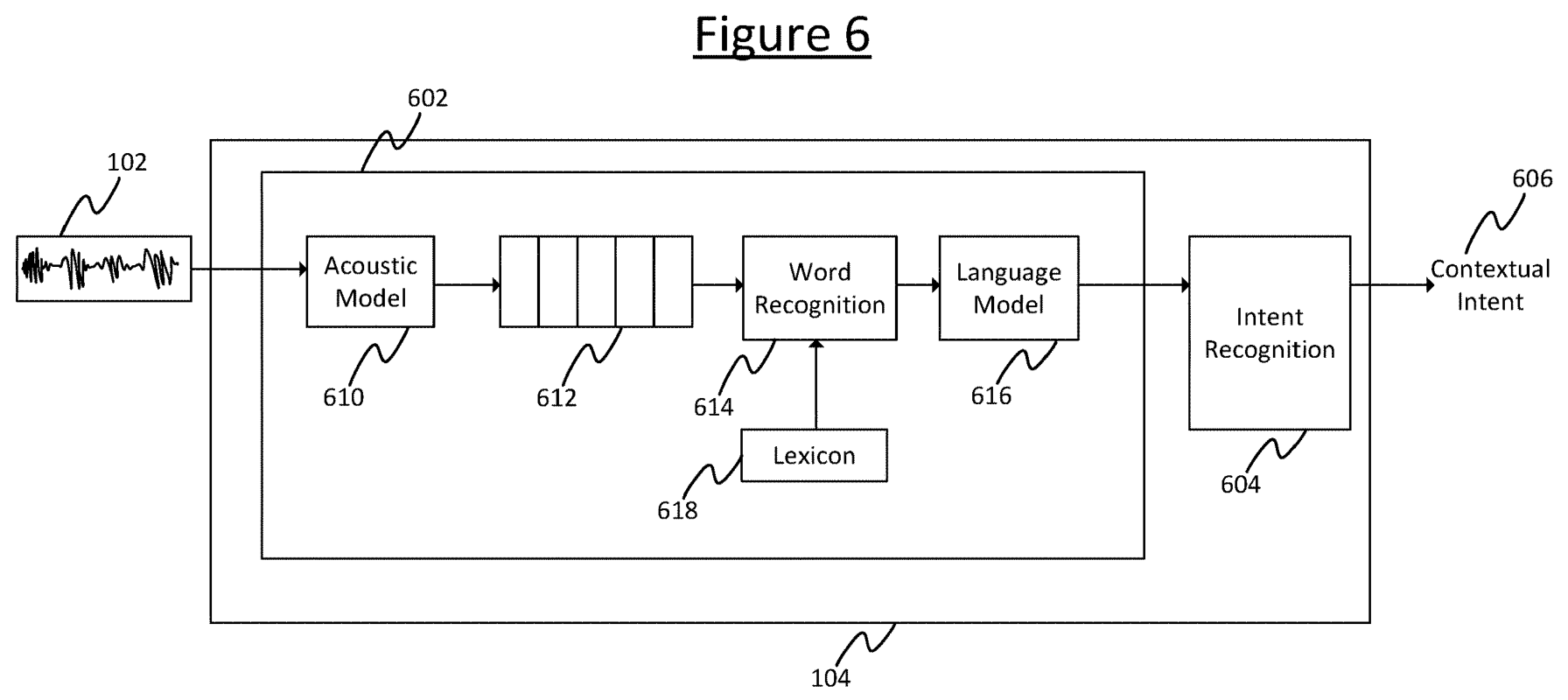

FIG. 6 shows a schematic representation of an example node 104. The node 104 comprises an automated speech recognition component 602 that provides 'speech-to-text translation, and intent recognition component 604. The spoken user input 102 is provided to the speech-to-text component 602, which translates the input 102 into a text string, and provides the text string to the intent recognition component 604 for extracting the contextual intent 606.

The speech-to-text component 602 comprises an acoustic model 610, a word recognition component 614, a language model 616, and a lexicon, also referred to as a language library, 618. Speech-to-text components per se are known in the art and therefore will not be described in detail herein. In summary, the spoken user input 102 is processed by the acoustic model 610 to identify phonemes 612. The word recognition component 614 uses the lexicon 618 to identify words based on the on phonemes 612. The word recognition component 614 may identify a number of different words that comprise one or more of the phonemes 612, each word having an associated confidence indicating the likelihood of the identified word being correct with respect to the user input 102. The language model 616 receives the identified words and their confidence score and generates the text string. The language model 616 may use the confidence scores associated with the identified words and/or learnt grammar to determine the most likely text translation of the user input 102.

In the nodes 104 disclosed herein, the lexicon defines a narrow lane of vocabulary, specific to the context. The lexicon may comprise two subsets of vocabulary: a constant vocabulary component and a variable vocabulary component.

The variable vocabulary component comprises words which depend on "current contextual data", as set out below. The variable vocabulary component may comprise, for example, nouns which are relevant to the context for only a period of time, that is when the nouns are relevant given the current contextual data. The constant vocabulary component comprises words that are always relevant for the context.

For example, the constant vocabulary component may comprise numbers, currencies, and times, as well as specific user actions associated with the context, such as "bet" or "order", while the variable vocabulary may comprise the names of horses running in an upcoming race or identifiers of products a user can purchase.

It will be appreciated that the term "word" used with reference to the lexicon 618 may refer to words or phrases. For example, a name comprising two words, such as "Red Rum" is considered a single "word" within the lexicon 618. That is, any phrase comprising multiple words which must be provided together to have their intended meaning are a "word" in the lexicon 618. A word can be considered an integer of the lexicon 618.

The voice-to-text component 602 of the node 104 generates a text string which comprises only the words defined in the lexicon 618 of the node 104. In this way, the intent recognition component 614 is provided with only the words which are relevant to the context for processing. The intent recognition component 604 can therefore more confidently identify an intent from the input 102.

It is known in the art that word recognition components 614 may attempt to understand words that are not defined in their corresponding lexicons 618. Since the intent recognition components 604 of the nodes 104 disclosed herein are designed to determine intent based only on the words of the lexicon 618, the voice-to-text component 602 does not need to understand these words. The voice-to-text components 602 may achieve this in a number of different ways.

The word recognition component 614 may attempt to identify the words of the user input 102 which are not defined in the lexicon 618. The word recognition component 614 would assign these words a low confidence score since they are not defined in the lexicon 618. The language model 616 may then filter out any words with confidence scores below a threshold, the threshold being defined such that any word identified which is not in the lexicon 618 would be associated with a confidence score below the threshold. The results text string would subsequently only comprise words defined in the lexicon 618.

Alternatively, the lexicon 618 may comprise an "unknown" word, which may be assigned to any word (set of phonemes) for which one of the other words in the lexicon 618 cannot be assigned. The unknown words may be assigned with a high confidence score if the word recognition component 614 is confident that the phonemes do not correspond to other words within the lexicon. The language model 616 may then remove any "unknown" words from the text string which are associated with a high confidence score, such that the result text string comprises only known words defined in the lexicon 618, i.e. words relevant to the current context.

In either case, the text string provided to the intent recognition component 604 is limited to words which are relevant to the context. Therefore, the text string is restricted to only a portion(s) of the speech input 102 that the voice-to-text component 602 was able to interpret.

FIG. 6 depicts one example architecture for intent recognition applied to voice inputs. Variations of this architecture may be used. For example, a more 'end-to-end' architect might combine speech recognition and intent recognition in a single model (such as a neural network that takes speech as input and provides an intent output directly). Such architectures may be used in the present context, to the extent they allow the subset of language interpretable to a node to be restricted to a narrow context. For example, such an architecture might still include a configurable lexicon, or the vocabulary may be implicitly restricted through a deliberately narrow choice of training data.

Figure 2:
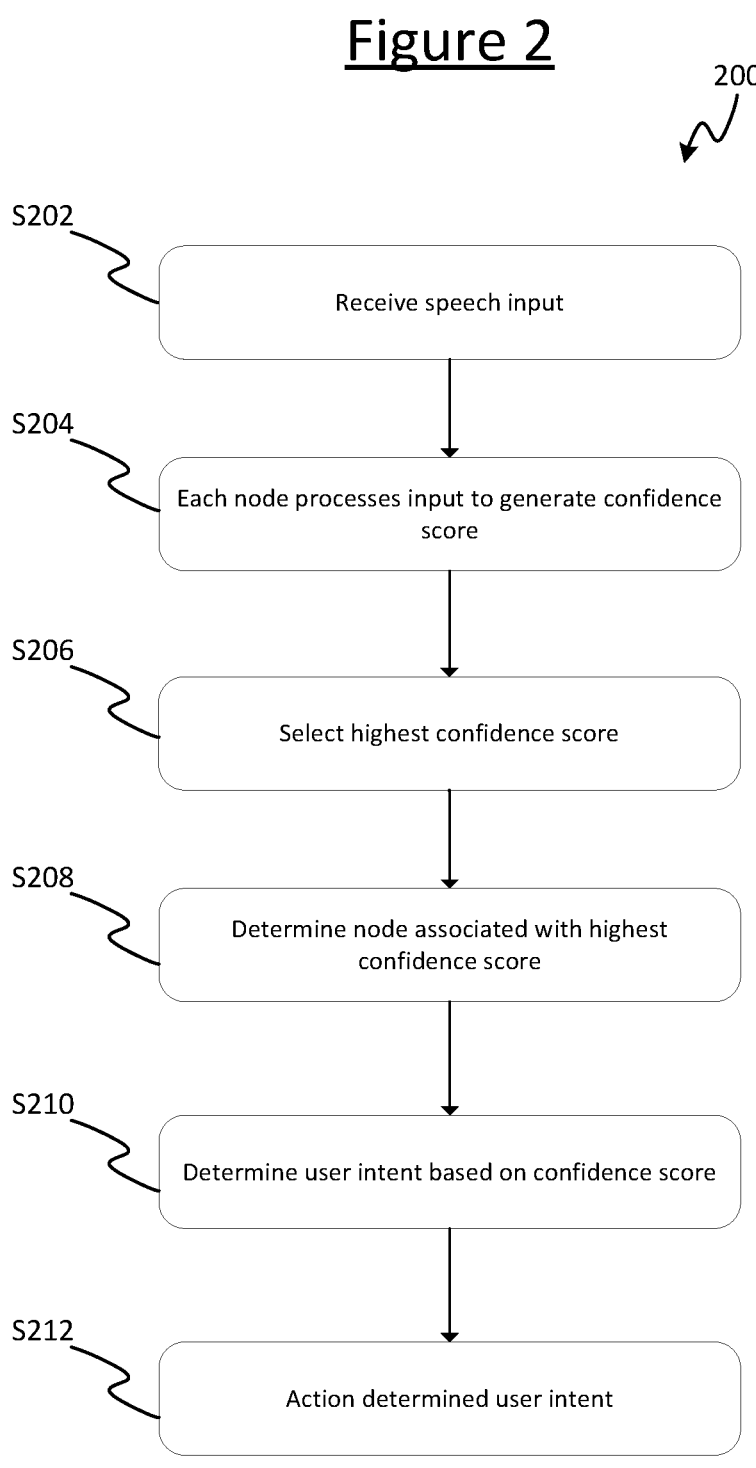
FIG. 2 shows an example method for processing, by the intent recognition system, a user input to effect an action based on a determined user intent.

FIG. 2 shows a method 200 for processing speech input 102 by the recognition system 100.

A speech input 102 is received at the system 100, step S202. The natural language input 102 may be a voice input. The speech input 102 may be received at a voice input component of a user device, such as a microphone. The speech input 102 may be received at the recognition system 100 in the form of a complete recorded message, that is a single message, or in real time as the user provides the input 102, that is as a continuous input.

The speech input 102 is provided to each of the nodes 104, where it may be processed in parallel by each of the nodes 104. Parallel processing by the nodes 104 may be performed in a multithreaded process on a remote server or virtual machine. Alternatively, parallel processing may refer to processing of the nodes 104 on different virtual machines, different physical machines, or different servers. The skilled person would understand that parallel processing may be implemented in many different ways known in the art.

Each node 104 computes a confidence score $C_i$, step S204. The confidence score $C_i$ represents the relevance of the speech input 102 to the context associated with the node 104. That is, a higher confidence score $C_i$ is computed by a node 104 associated with a context which is determined to be more relevant to the input 102.

The confidence score $C_i$ may be calculated based on both an amount of the input 102 that the contextual intent 606 identified by the node 104 corresponds to and the confidence with which the intent has been identified from the input 102. In this way, a node 104 which can confidently provide a contextual intent 606 based on a larger portion of the input 102 computes higher a confidence score $C_i$ than a node 104 which can only confidently provide a contextual intent 606 for a smaller portion of the input 102.

The confidence scores $C_i$ computed by each node 104 are passed to the context selector 106. The context selector 106 selects a highest confidence score, as discussed in more detail later, at step S206, and identifies the node 104 by which the confidence score was computed, S208.

For example, the context selector 106 receives the confidence scores $C_1$, $C_2$, $C_3$, . . . , Cn. If $C_2$ is the highest confidence score, the context selector 106 selects $C_2$ and identifies that it has been received from node 104*b*. The context associated with the node 104*b* may also be identified by the context selector 106 as the relevant context.

The context selector may also receive an intent derived by each of the nodes 104, referred to herein as a context intent. The context intent is a classification of an action the user intends to perform determined by the node 104 by processing the speech input 102.

The context selector 106 provides, as an output, a user intent 108. The user intent 108 is the context intent associated with the highest confidence score, that is the context intent derived by the node 104 computing the highest confidence score, step S210. The user intent 108 may be used to effect an associated action, e.g. a transaction defined by the user intent, step S212.

The context selector 106 is a component of a controller 110. The user intent 108 is output from the context selector 106 and used by the controller to determine an action to implement. The controller 110 generates an instruction corresponding to the determined action, which is provided to a processor (not shown) for executing, such that the processor executes the determined action.

The intent recognition system 100 described above can, therefore, identify both the relevant context and the intent of the user from the speech input 102 without any further user input.

Modified Intent Recognition System

Figure 1A:
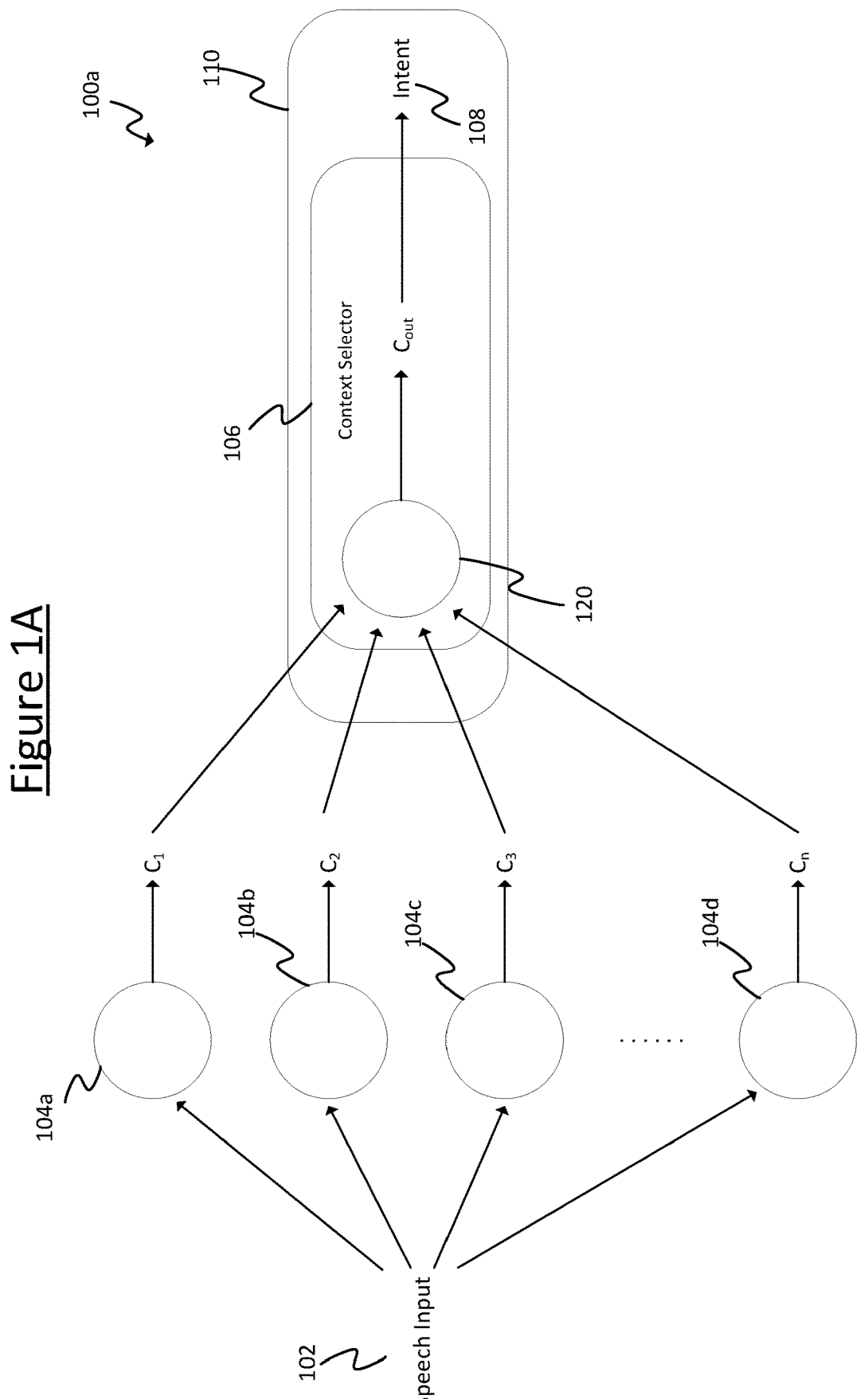
FIG. 1A provides an example modified intent recognition system.

FIG. 1A shows an example modified intent recognition system 100*a*. The modified intent recognition system 100*a* differs from the intent recognition system of FIG. 1 in that the context selector 106 comprises a dynamic node 120. The nodes 104 may be referred to as static nodes herein.

The static nodes 104 of the modified intent recognition system 100*a* are configured as described above, with a predefined lexicon 618 defining the words which are relevant to the context of the static node.

Figure 6A:
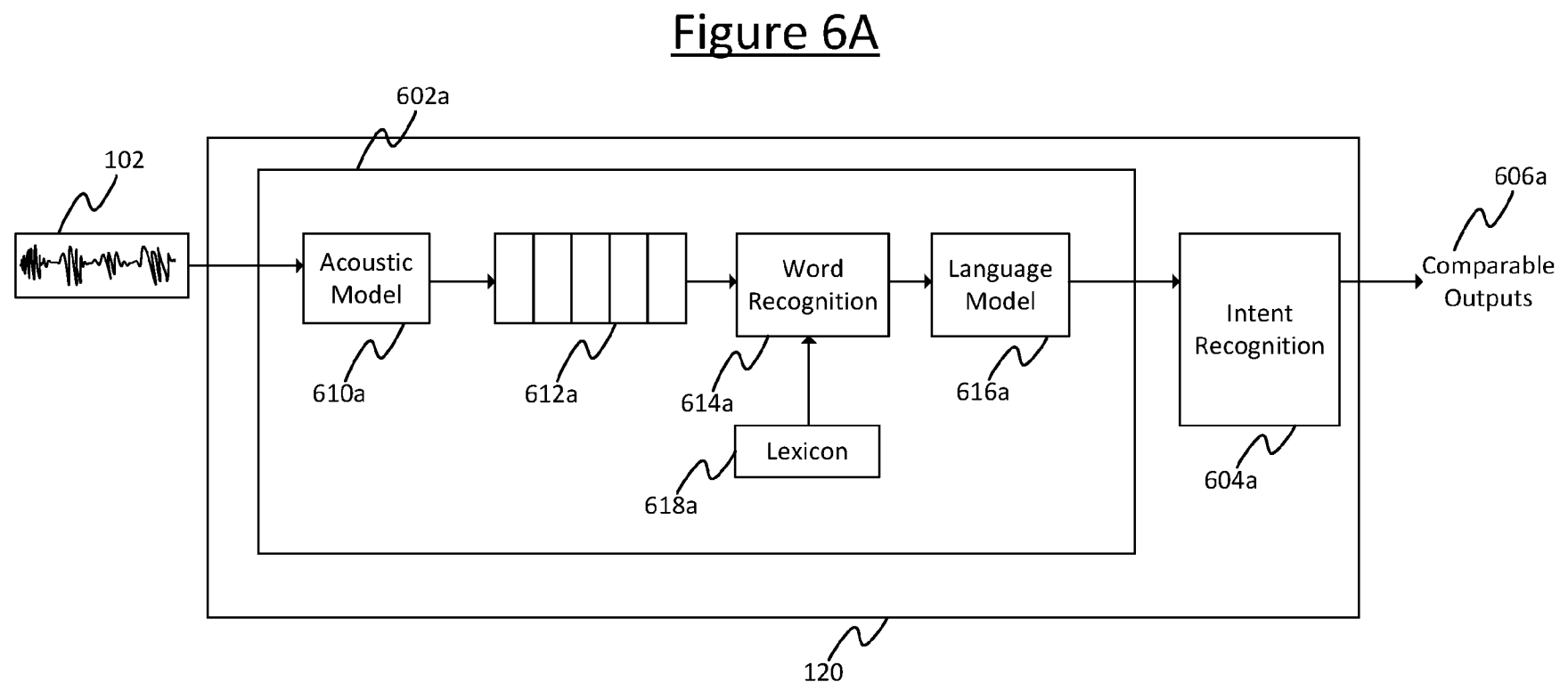

The dynamic node 120 has a similar structure to the dynamic node 104 shown in FIG. 6, and is shown in FIG. 6A. The dynamic node 120 comprises an automated speech recognition component 602*a* that provides 'speech-to-text' translation, and an intent recognition component 604*a*. The speech-to-text component 602*a* comprises an acoustic model 610*a*, a word recognition component 614*a*, a language model 616*a*, and a lexicon, also referred to as a language library, 618*a*. The spoken user input 102 is processed by the acoustic model 610*a* to identify phonemes

612*a*. The spoken user input 102 may be played at a faster than real-time speed when processed by the dynamic node 120.

The lexicon 618*a* of the dynamic node 120 does not comprise a predefined set of words relevant to a context of the node. Instead, the lexicon 618*a* comprises only the words of the outputs of each static node 104 corresponding to the highest confidence scores. Alternatively, the lexicon 618*a* of the dynamic node 120 may comprise only words of the outputs of each static node 104 corresponding to confidence scores which meet a predefined threshold score, such that some static nodes 104 may contribute more than one output to the lexicon 618*a* and some static nodes may contribute no outputs to the lexicon 618*a*. In another alternative, the lexicon 618*a* of the dynamic node 120 may comprise only words of a predefined number of outputs of each static node 104 corresponding to the predefined number of highest confidence scores computed said static node 120. For example, the three outputs with the highest confidence scores from each static node 120 may be used. Other variation will be apparent. The criteria for including words in the lexicon 618*a* may vary and may be dependent on the confidences scores computed by the static nodes 120.

The lexicon 618*a* of the dynamic node 120 is associated with a library comprising all words of each lexicon 618 of the static nodes 104. Words of the library are then selected, or "turned-on", automatically based on the outputs of each static node 104 to define the lexicon 618*a* of the dynamic node 120 for use by the word recognition component 614*a* of the dynamic node 120 when passing the speech input 102. A software program executed on the dynamic node 120 may determine the words to be selected for the lexicon 618*a* and affect the selection.

The intent recognition component 604*a* of the dynamic node 120 is configured to compute comparable confidence scores for each contextual intent 606. That is, the intent recognition component 604*a* does not devise a contextual intent 606 as in the static nodes 104, but rather assigns comparable confidence scores to the contextual intents 606 devised by the static node 104 such that one of the contextual intents 606 can be identified as the most likely. The outputs of the intent recognition component 604*a* are referred to as comparable outputs 606*a*.

Figure 2A:
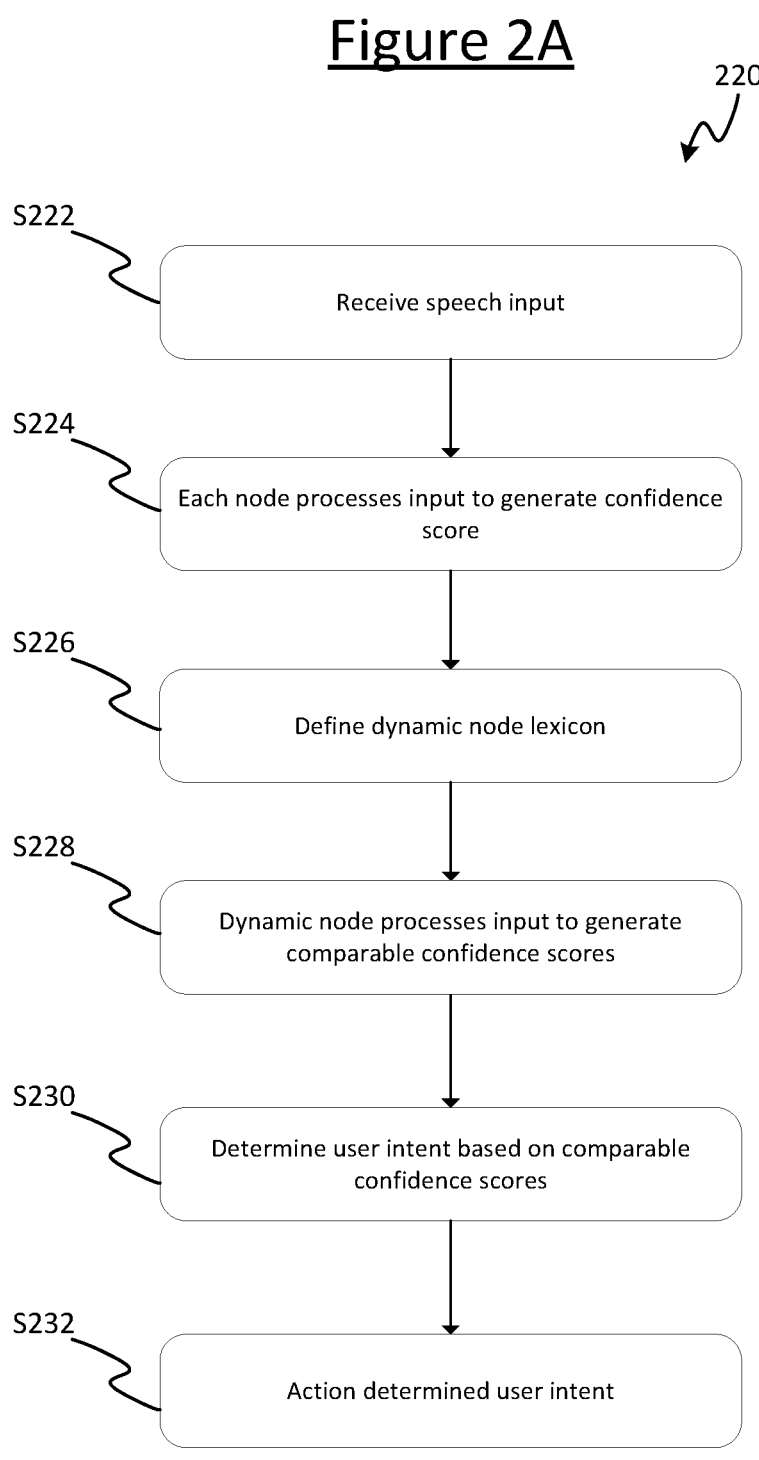
FIG. 2A shows an example method for processing, by the modified intent recognition system, a user input to effect an action based on a determined user intent.

FIG. 2A provides a method 220 for processing the speech input 102 by the modified intent recognition system 100*a*.

At step S222, the speech input 102 is received by the modified intent recognition system 100*a* and process by each static node 104 of the system 100*a*, step S224, to generate a confidence score. Each of the static nodes 104 also generates a contextual intent 606 as described above. The contextual intent 606 generated by any single static node 104 corresponds to a highest confidence score computed by that node 104.

The contextual intents 606 generated by each static node 104 are provided to the dynamic node 120. Words of the lexicon 618*a* of the dynamic node 120 which correspond to words of the contextual intents 606 are turned on to define the lexicon 618 of the dynamic node 120, step S226.

Once the lexicon 618*a* has been determined, the dynamic node 120 processes the speech input 102 to compute comparable confidence scores for the contextual intents 606 based on the words of the lexicon 618*a*, step S228.

The comparable confidence scores $C_{out}$ are output by the dynamic node 120 and processed by the context selector 106 to identify the contextual intent 606 associated with the highest comparable confidence score, and thus the user intent 108, step S230.

An action associated with the user intent 108 is determined, step S232, and implemented, as described above.

The modified intent recognition system 100*a* provides an improvement over the intent recognition system 100. In the intent recognition system 100, the user intent 108 is selected based on the highest confidence score $C_i$ computed by any of the static nodes 104. However, these confidence scores are not necessarily comparable.

In a simplified example, a lexicon 618 of a first static node 104*a* comprises the words "rat", "mat", "cat", while a lexicon 618 of a second static node 104*b* comprises the words "catalogue", "brochure", "magazine". If a speech input 102 is provided which is the word "cat", the second static node 104*b* would compute a higher confidence score for the words "catalogue" in its lexicon 618 than the first static node 104*a* for the word "cat".

In the intent recognition system 100 of FIG. 1, the user intent 108 would therefore be determined as the contextual intent 606 derived by the second static node 104*b*, i.e. the contextual intent 606 comprising the word "catalogue".

In the modified intent recognition system 100*a*, the words selected from the library to form the lexicon 618 are those of the contextual intents 606 derived by the first and second static nodes 104*a*, 104*b*. In the example of passing the speech input 102 "cat", the lexicon 618*a* would comprise "cat" and "catalogue" based on the contextual intents 606 derived from the first and second statice nodes 104*a*, 104*b* respectively.

The dynamic node 120 is complied, that is, the words of the lexicon 618*a* selected, faster than real-time because it is only the selection of words for including in the lexicon 618*a* that needs to be effected.

Since the lexicon 618*a* of the dynamic node 120 is limited to the words identified by the statice nodes 104, the dynamic node 120 will compute a highest comparable confidence score associated with the spoken word. In this example, the dynamic node 120 computes a highest comparable confidence score associated with the word "cat". Thus, the user intent 108 derived by the modified intent recognition system 100*a* is more accurate.

The dynamic node 120 is recompiled, i.e. the words for use as the lexicon 618 selected, for each new speech input 102 received at the modified intent recognition system 100*a*.

System Architecture

The intent recognition system 100 described can be expanded to include multiple controllers 110, each being associated with a subset of the nodes 104.

Figure 4:
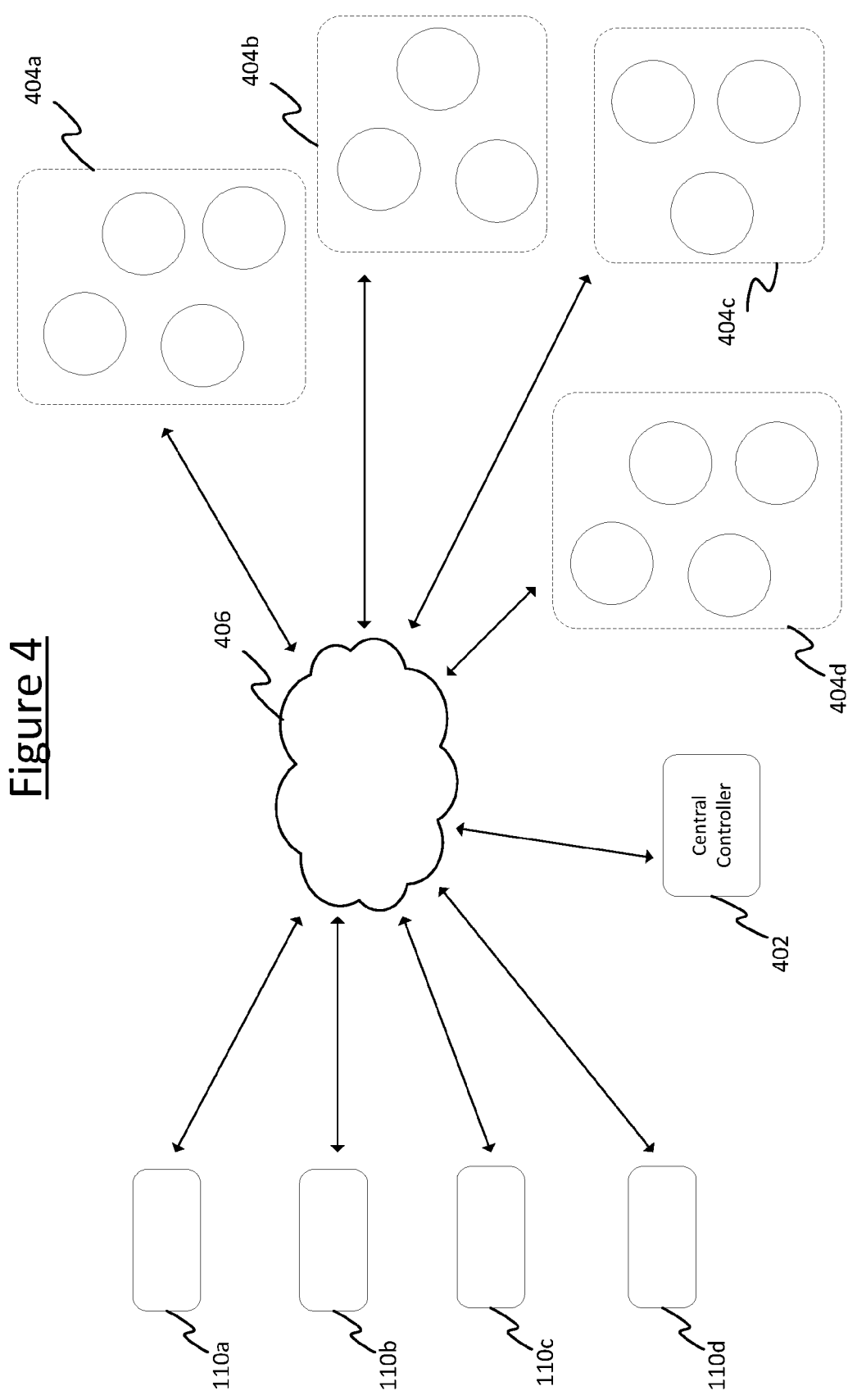
FIG. 4 is a schematic diagram showing the intent recognition system.

FIG. 4 is a schematic diagram showing the intent recognition system 100. The intent recognition system 100 shown in FIG. 4 further comprises a central controller 402.

Four controllers 110*a*, 110*b*, 110*c*, 110*d* are shown in the system 100 of FIG. 4. Each of these controllers 110 may correspond to a difference service system. Examples of service systems may include food ordering service, booking services, financial services, etc. The controllers 110*a*, 110*b*, 110*c*, 110*d* may be executed by a computing device of the service system to which it corresponds.

The system 100 of FIG. 4 also comprises fourteen nodes 104, separated into four different node groups 404*a*, 404*b*, 404*c*, 404*d*. A node group 404 is a collection of nodes 104 which correspond to similar contexts, such that a group of nodes 404 is suitable for a service system. Each group of nodes 404 can be considered to relate to a broader context, encompassing the contexts of each of the nodes 104 of the group 404.

The central controller 402 of the system 100 can be used to define the node groups 404*a*, 404*b*, 404*c*, 404*d*. That is, the central controller 402 determines which contexts, and so nodes 104, are relevant for a particular service system, and groups the nodes 104 to form a node group 404. It will be appreciated that the nodes 104 of a node group 404 need not be geographically grouped to form the node group 404. A node group 404 as used herein refers to a group of nodes 104 identified as being relevant to a service system, and configured to receive inputs 102 from the same controller 110 as described below.

The central controller 402 identifies the controller 110 of the services system corresponding to each node group 404, and provides an instruction to the controller 110 causing the controller 110 to pass inputs 102 to the nodes 104 of the identified node group 404.

For example, the central controller 402 identifies a set of four node 104 which are relevant to a service system, such as a booking system, and groups these nodes 104 to form node group 404*a*. The central controller 402 identifies the controller 110*a* corresponding to the service system and sends instructions to the controller 110*a* to cause the controller 110*a* to send user inputs 102 to the nodes 104 of node group 404*a*.

As described with reference to FIGS. 1 and 2, the user inputs are processed by each node 104. In the system shown in FIG. 4, the inputs 102 received at a controller 110 are processed by each node 104 of the node group 404 corresponding to the controller 110.

The confidence scores computed by the nodes 104 of the node group 404 are then passed back to the corresponding controller 110 for processing by the context selector 106 of the controller 110.

It will be appreciated that the context selectors 106 of the controllers 110 may also comprise dynamic nodes 120 as described with reference to FIGS. 1A and 2A. The speech inputs 102 are processed by the node groups 404 comprising static nodes 104 and then passed to the dynamic node 120 of the corresponding context selector 106 for further processing. The context selector 106 of the corresponding controller 110 process the comparable confidence scores to determine the user intent 108.

The components of the system 100 (i.e. the controllers 110, nodes 104, and central controller 402) may communicate via a network 406, for example the Internet. The nodes 104 are implemented by computing devices, such as servers or virtual servers, which may be distributed geographically such that they are located near users who are likely to provide inputs 102 for processing by the nodes 104. A node 104 or group of nodes 404 may be associated with a particular location, for example a particular geographical location of an event, which may be used to determine both the node's context and the location at which the node 104 is implemented. The controllers may be distributed to, and executed on, computing devices of providers of the service system.

Figure 5:
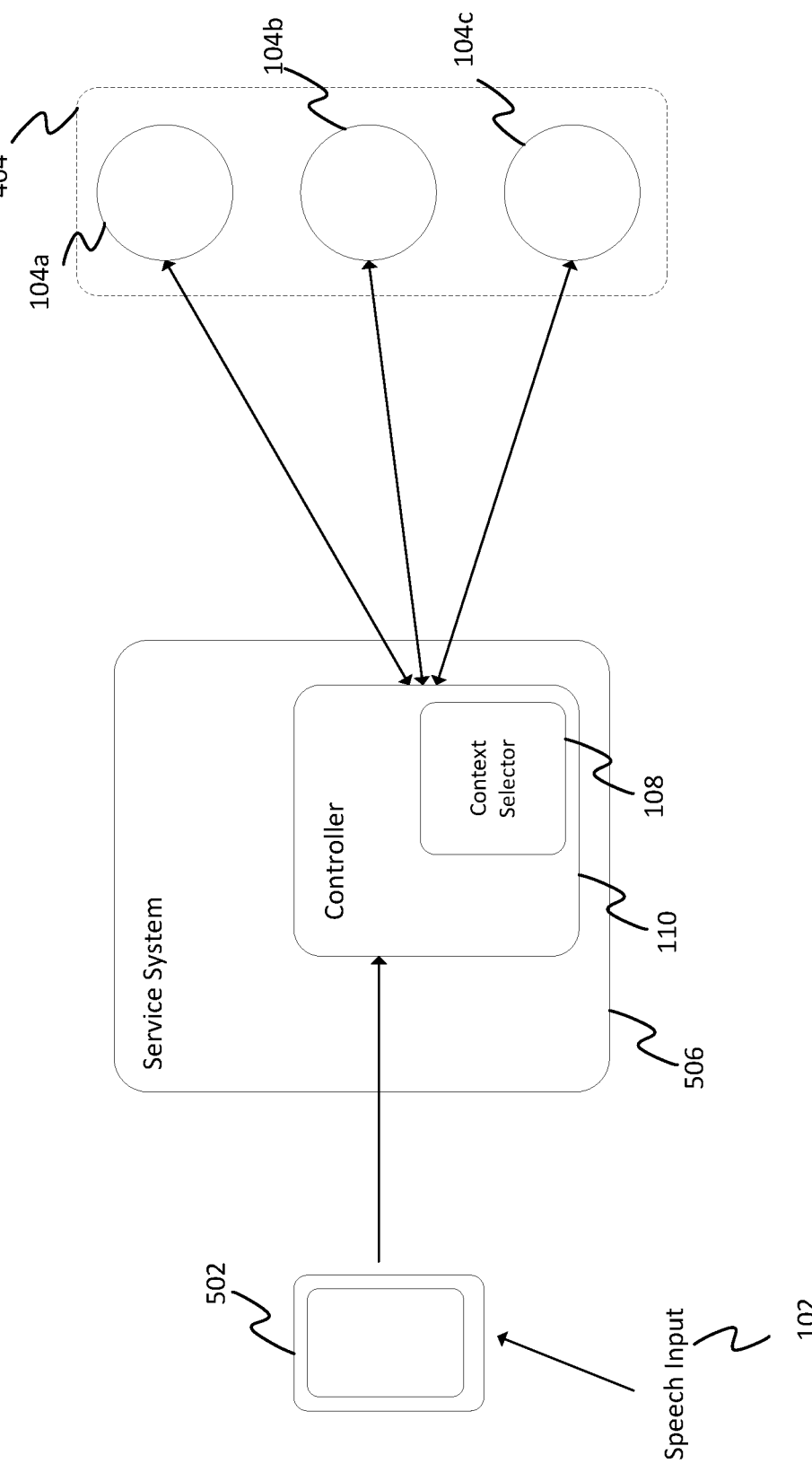
FIG. 5 schematically illustrates the intent recognition system in use by a service system.

FIG. 5 shows the system 100 in use by a service system 506. A user may access the service system 406 on a user device 502, which communicates with the service system 506 via the network 406 (not shown). The service system 506 may be accessed via an internet browser or via an application stored on the user device 502.

The user speaks their speech input 102 to the user device 502, which transmits the speech input 102 to the service system 506 via the network 406. The speech input 102 is provided to the controller 110 of the service system 506, which causes the spoken input 102 to be sent to the nodes 104 of the node group 404 associated with the controller 110.

The nodes 104 of the node group 404 process the user input 102 to generates the context intents and corresponding confidence scores, which are sent back to the controller 110, and more specifically the context selector 108, which uses the confidence scores to identify the user intent 108 as discussed above. The context selector may comprise a dynamic node 120 for processing outputs of the static nodes 104 to compute comparable confidence scores and thereby identifying the user intent 108.

The user intent 108 may be used by the service system 506 to implement the associated action. The action may cause information to be stored in the service system 506, or accessed from a memory of the service system 506 and provided to the user device 502. In some embodiments, the service system 506 may interact with a third-party system (not shown) to implement the action.

In some embodiments, the group of nodes 404 comprises a node 104 for interpreting portions of the input which are not associated with the transactional intent of the user. For example, a user may provide their intent in a conversational manner, in which the input 102 comprises portions which do not provide any information required for interpreting the intent. This additional node 104, referred to herein as a non-intent node 104, may be trained to interpret only these portions of the input 102.

The non-intent node 104 determines the portions of the input 104 which are not related to the intent. Once these portions have been identified, they can be removed from the input 102 before it is provided to the other nodes 104 of the group. In this way, the other nodes 104 need only process the portions of the input 102 which are relevant to the intent.

Rebuilding Nodes

As set out above, each node 104 is associated with a different context. In some embodiments, the contexts change over time, such that the nodes 104 change dynamically. Nodes 104 may be deployed by the central controller 402 when their associated context becomes relevant, and removed when the context is no longer relevant.

This both improves computational efficiency as only the relevant nodes 104 are required to process the speech input 102, and allows the recognition system to remain relevant to changes happening relating to the broader context.

Each node 104 is rebuilt periodically based on the context at that time. For example, if the context is a restaurant, the recognition engine is rebuilt based on the menu of the restaurant at the time of rebuild. The term "rebuild" is used herein to refer to the actions of compiling and building the nodes 104.

The periodicity with which a node 104 is rebuilt may depend on the context, and more specifically how frequently information about the context changes. That is, a context for which information changes very quickly may have a node which is rebuilt many times per minute, while a context which changes infrequently may only be rebuilt monthly or yearly. It will be appreciated that the nodes may be rebuilt at any appropriate interval.

The rebuild process is an automatic process implemented at the predefined intervals by the central controller 402 or alternatively when the central controller 402 determines that there is a change in current contextual data. The intervals at which the rebuild process is implemented may be so small that rebuild is effectively continuous.

The central controller 402 receives current contextual data regarding a context at the predefined intervals or continuously. The current contextual data is used to define the language which is relevant for the node 104. For example, if the context is a particular sports match, the current contextual data may comprises information such as the players currently playing, the current score, the remaining time, etc. The current contextual data may be stored by the central controller 402.

Based on the current contextual data, the central controller 402 generates, or builds, the variable vocabulary component of the language library or lexicon 618. As described above, the language library comprises a variable vocabulary component which comprises nouns, and known phonetic aliases of the nouns, which are relevant to the current contextual data. A phonetic alias is a way in which a word may be pronounced. For example, the word "bath" has the phonetic aliases "bath" and "bath". Phonetical aliases may also include common mispronunciations of words.

The language library may further comprise a constant vocabulary component which may comprise words which are always relevant to the context and/or other parts of speech. The words of the constant vocabulary remain the same for a given context and therefore do not need to be changed with time/rebuild.

The language library 618 compiled comprising the constant vocabulary component and the variable vocabulary component derived from the current contextual data may be referred to in the context of rebuilding as the new language library 618'.

Once the new language library 618' has been generated, the node 104 can be rebuilt. This may be done in one of two ways.

The central controller 402 may compile a new node 104' using the new language library 618'. That is, the central controller 402 creates a new instance of the node 104' for the context that is relevant to the current contextual data and comprising or using the new language library 618'. The new node 104' may also be referred to as an updated node.

The central controller 402 replaces the node 104 for the context with the new node 104' for the same context. In this way, the central controller 402 deploys the new node 104' and removes, or retires, the old node 104 from use. The new node 104' may have a different node ID to the old node 104.

The central controller 402 sends instructions to the controllers 110 if a new node 104' is deployed or a node 104 removed from use, such that the controllers 110 send user inputs 102 to the deployed nodes.

Alternatively, the central controller 402 does not generate a new instance of the node 104, but rather provides the new language library 618' to the node 104 currently deployed. That is, the new language library 618' replaces the old language library 618 in the same node 104 (software instance).

The language library of a dynamic node 120, if also included in the system, is also rebuilt when the vocabulary of a language library 618 of any of its connected static nodes 104 is rebuilt. The language library of the dynamic node 120 is rebuilt to comprise all words in the lexicons 618, 618' of the static nodes 104.

In a similar manner to the static nodes 104, the dynamic node 120 comprises a constant vocabulary component and the variable vocabulary component. Since only the variable vocabulary component of the static nodes 104 changes as nodes 104 are rebuilt, so too is the variable vocabulary component of the dynamic node 120.

The language library may be held in a database or file, and loaded into memory. Alternatively or additionally, the language library may be loaded into the code of the node 104 and compiled, providing improved speed of user intent recognition. The source code may include instructions for interpreting grammar and semantics of speech inputs.

Phonetic aliases may be based on previous user inputs 102 for a former node 104 relating to historic contextual data which is, at least in part, similar or the same as the current contextual data. The previous user inputs 102 are tagged and logged for future use when the nouns become relevant to the context again. In this way, the new node 104 can process more accurately the user inputs 102 as previously identified phonetic aliases can be used.

For example, many names are not pronounced as they may be expected to be pronounced based on their spelling. Either the spelling of the noun is not intuitive, or the user uses a common mispronunciation of that noun. For these cases, a phonetic alias of the noun is created and remembered for all future uses of this name.

For example, given a context of Premier League football matches, the current contextual data may relate to an Arsenal verses Tottenham Hotspurs match. The historic contextual data, of which a portion overlaps with the current contextual data, may be an Arsenal verses Newcastle match. In this example, the overlapping data is the names of the Arsenal players and support team.

User inputs received while the Arsenal verses Newcastle match is relevant are logged. When the Arsenal verses Tottenham Hotspurs match becomes relevant, the language library comprises phonetic aliases logged during the Arsenal verses Newcastle match relating to the Arsenal team.

It will be appreciated that the use of overlapping contextual data portions extends to other contexts.

Confidence Scores

The confidence scores $C_i$ calculated by each node 104 denote an extent to which the node 104 was able to interpret the speech input 102. That is, the node's confidence score indicates how confident it is in its output, which in turn conveys expected relevance of the context of the node 104 because of the way in which the lexicon has been restricted.

In the method of FIG. 2, the context selector 106 is said to determine a highest confidence score—see step S206. The highest confidence score may be determined by considering the confidence scores $C_i$ relative to each other, and based on a configurable minimum.

As a result of the processing of the input 102 by the nodes 104, there are three possible scenarios:

i. One of the confidence scores $C_i$ is significantly higher than the other computed confidence scores. This indicates that the context of the node 104 associated with said confidence score is the relevant context, such that only the output of that node need be considered. The context intent of the node computing the confidence score is used as the user intent 108.

ii. All of the confidence scores $C_i$ are too low when compared to the configurable minimum. In this case, it is determined that none of the contexts of the nodes 104 are relevant.

iii. Two or more of the confidence scores $C_i$ have a similar value, indicating that the user input 102 relates to two contexts, with these confidence scores being significantly higher than the other computed confidence scores. This may be the case if the user provides two separate commands in the same input 102 for example. In this scenario, the user intent 108 comprises context intents associated with each of the identified context scores $C_i$. Alternatively, this may be because there are two ways in which the language used by the user may be interpreted. A grammar component, discussed below, may be used to determine which of the contexts is relevant.

The selected highest confidence score(s) are therefore selected based on their statistical significance. The confidence selector 106 comprises logic which is programmed to automatically select the one or more highest confidence scores. The highest confidence score (se) may also be referred to herein as significant confidence score(s).

As set out above, the confidence score $C_i$ is based on both an amount, or percentage, of the input 102 which has been used to determine the contextual intent 606 and the confidence with which the intent recognition component 604 has classified the contextual intent 606. The amount, or portion, may be a percentage of the time of the input 102 which has been understood or a percentage of the words of the input 102 which have been understood.

The confidence with which the intent recognition component 604 has classified the contextual intent 606 is the confidence that the intent recognition component 604 has in its interpretation of the portion it was able to interpret. If this confidence is too low, the word may be ignored for the purpose of intent recognition. There may be a predefined threshold for the confidence with which the contextual intent 606 has been clarified, below which the associated word is ignored.

The percentage of the input 102 which has been understood is an important factor in calculating the confidence score $C_i$ because user intent 108 must be a full transaction. All nodes 104 within a group 404 will be able to confidently interpret portions of the user input associated with the constant vocabulary component of the lexicon 618, but only the node 104 corresponding to the context for which the user has provided their input 102 will understand the portions specific to that context, e.g. the nouns.

It will be appreciated that the user input 102 may comprise large portions which are not understood by any of the nodes 104 of the group 404. This may be the case if the user provides their intent in a conversational manner, rather than a purely transactional one. Therefore, in some instances, all confidence scores are low. However, one of the confidence scores is significantly higher when compared to the others, such that the corresponding node 104 relates to the context.

Figure 3:
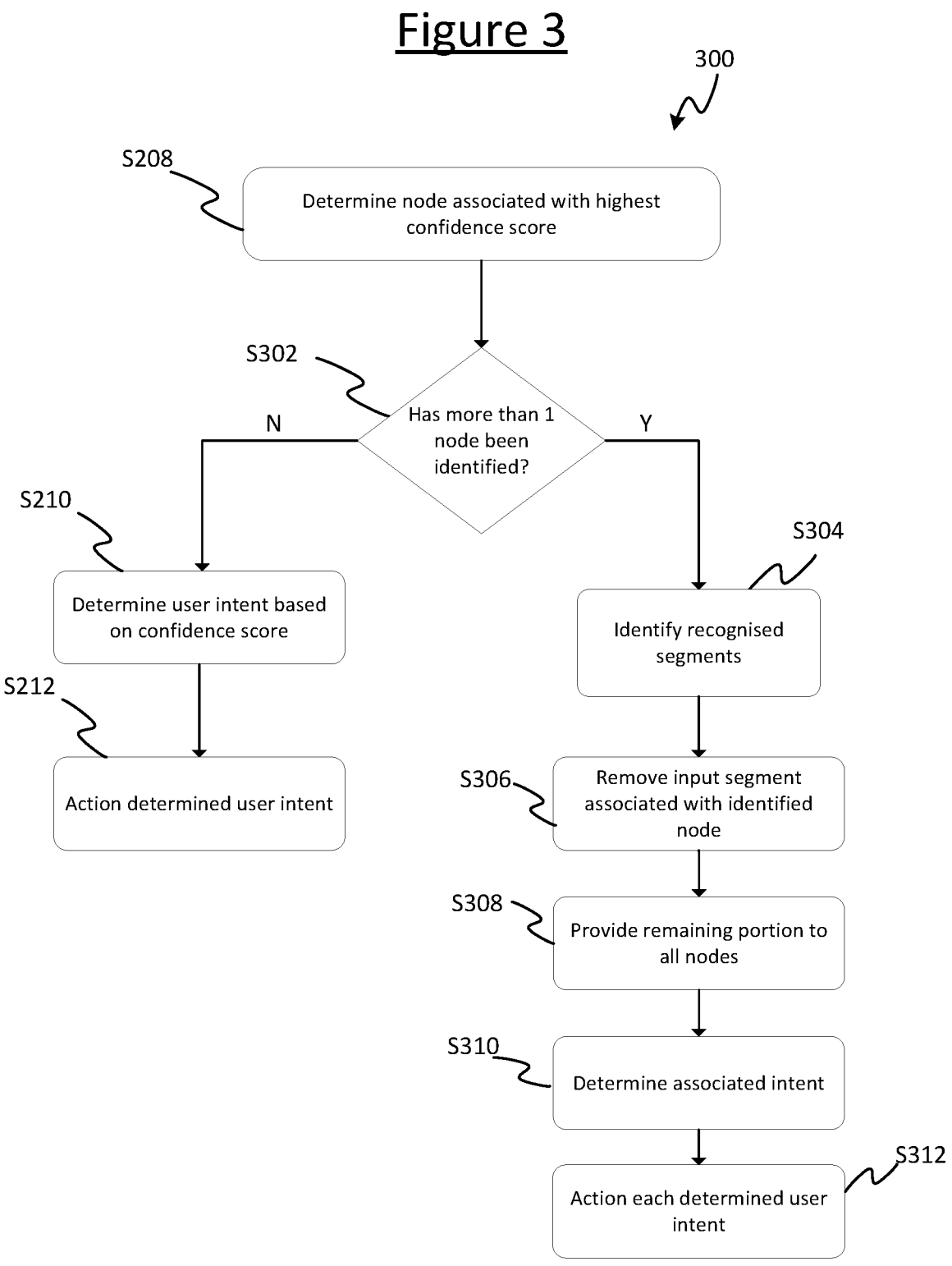
FIG. 3 shows a modified method for if more than one node is identified as relevant.

FIG. 3 shows a method modification 300 which can be applied to the method 200 shown in FIG. 2 to account for multiple highest confidence scores being identified.

The user provides the speech input 102 and the recognition system 100 implements steps S202 to S208 of the method 200. Steps S202 to S206 of method 200 are not shown in FIG. 3.

The recognition system 100, at step S302, determines if more than one node 104 has been identified, that is if there is more than one highest confidence score as described above. If there is only one identified node 104, that is, one of the confidence scores is significantly higher than the other confidence scores, steps S210 and S212 of the method 200 are performed as described with reference to FIG. 2.

If, however, it is determined that there is more than one identified node 104, that is that two or more confidence scores are similar, the recognition system 100 determines a segment of the input 102 corresponding to each of the highest confidence scores, step S304.

The segments of the speech input associated with the identified node 104 (i.e. those associated with the highest confidence values) are removed, step S306, and the remaining portion of the speech input 102 provided to each of the nodes 104, step S308. The remining portion of the speech input 102 may be referred to as a reduced user input. To achieve this, a timestamp associated with each segment corresponding to a highest confidence score may be determined, and the input 102 modified to remove the segment with that timestamp.

Each node 104 processes the remaining portion and generates a confidence score, which is used by the context selector 106 to determine the user intent of the portion, step S310. As above, there may be one or more intents identified, i.e. highest confidence values, by processing the remaining portion of the input 102. It will be appreciated that, in some instances, the highest confidence score computed with respect to the remining portions of the user input may not meet the minimum confidence score required to indicate the portion as relevant, and therefore may be ignored.

The identified context intents for each portion are combined and output as the user intent 108. The combined user intent 108 comprises multiple different actions to be implemented. The associated actions are implemented at step S312.

In some embodiments, if more than one highest confidence score is identified at step S208, the user intent 108 is that identified for each of the relevant portions, and no further processing of the user input 102 is performed. That is, steps S306 and S308 are not implemented.

In some instances, it may be found at step S304 that the highest confidence scores are associated with the same segment of the user input 102. This is the case if a single segment, or phrase, can have two meanings, both of which have been identified by the processing nodes 104. In this case, the grammar may be assessed to determine which of the nodes 104 is relevant.

In many situations, context is sufficient to identify the user intent of a spoken input. However, in some instances, it is important to understand more than words since there may be many valid understandings of a spoken string.

For example, given a context of a horse race, there may be a horse named "Thirty Eight" running. A spoken user input could be "Five euro thirty eight" which translates accurately to both "€5.38" and "€5 Thirty Eight". The nodes 104 would identify both possible context intents with similar confidence scores, both relating to the same segment of the input 102.

The language model 616 of each node 104 may traverse both examples to see if one makes more sense based on the immediately relevant contexts. In this example, the former makes sense, and the latter does not. It is noted that if there was not a horse running by that name at that time, the phrase "thirty eight" would not be associated with a name in the current contextual data, and the input would not have been processed to identify "€5 Thirty Eight" as a possible context intent.

In this way, the grammar of the spoken user input 102 is used to determine the user intent. That is, the user intent 108 is the contextual intent 606 which has a statistically significant confidence score and which makes grammatical sense.

Handling User Inputs

In the recognition system set out above, spoken user inputs 102 are processed in real-time. That is, they are processed by each of the nodes 104 of the relevant set of nodes 404 when they are received. Even if multiple user speech inputs 102 are received at substantially the same time, in most cases, the recognition system 100 is able to process the inputs 102 as they are received.

In some embodiments, the recognition system 100 may comprise a message queue. A message queue may be used in systems where the system hardware is not able to process inputs 102 quickly enough for the rate at which they are received. The message queue stores inputs 102 received from one or more users for processing. The inputs 102 are queued in chronological order of time of receipt at the message queue. The message queue may be a distributed message queue, that is the message queue may be embodies as a data storage system comprising a cluster of data storage nodes.

Other known techniques may be used to manage receiving inputs 102 from multiple users at substantially the same time. These techniques relate to the management of multiple live streams.

Example Use Cases

The recognition system 100 set out above may be used in any system in which a user may wish to provide instructions via a speech input. The recognition system 100 is particularly useful in some scenarios, as discussed below.

The recognition system 100 is able to handle a large number of inputs 102 received from multiple users at the same time. The inputs 102 are received at the recognition system 100 and processed in real-time.

It may be important to be able to accurately process the inputs 102 in order to determine the user's intent such that the correct associated action is implemented in response to the input 102. This may be the case if the action is difficult to reverse or has some legal or financial implications. The recognition system 100 provides accurate user intent recognition by processing the inputs 102 by all of the specifically trained nodes 104 of the associated set of nodes 404 and selecting the most likely intent based on the associated confidence scores. Since the nodes 104 are each specific to a particular context, any intent identified by the recognition engine is more accurate with respect to that node 104. By only selecting the appropriate node 104 after processing by each of the nodes 104, based on the confidence score associated with the context intent, the most relevant node 104 for the given input 102 can be identified more accurately. Thus, the recognition system 100 meets the requirements of processing user inputs 102 accurately, and therefore ensures that the correct action is implemented.

The action could, for example, be one of outputting the recognized intent to the user via an output device, for example a visual rendering on a display. For example, in a betting context, the intent might denote a particular event (e.g. specific horse races) as well as interpreted variables (such as a bet amount, bet entity etc.), which the user can review, with an option for placing the bet automatically. For example, a virtual 'betting slip' may be populated within a betting application based on the recognized intent.

It may also be important to process inputs in real time. This is possible with the recognition system 100 disclosed herein through the use of the nodes 102 each processing the speech user input 102 to determine the user intent.

Therefore, the recognition engine 100 disclosed herein is well suited for use in a system requiring accurate real-time results based on speech inputs received from multiple users at the same time.

Some non-limiting example use cases are provided. The service system 506 may be a betting system, with the contexts being different sporting events on which a user may wish to place a bet. The user intent 108 can be used to place the bet. In another example, the service system 506 may a booking system, where the different contexts may be different services managed by the booking system, and the user intent 108 used to store the booking and take payment. In a further example, the service system 506 may be a food ordering system, where the different contexts are different restaurants from which a user can order. In yet another example, the service system 506 may be an insurance company, where the different contexts are the insurance policy options and the current contextual data comprises the names of customers with upcoming policy renewal dates.

In another example, the system 100 may be used for the purpose of form filling, in which a user provides a speech input 102 comprising the information required to complete a form. This is an example of the intent being complex by design, that is it would be expected that multiple nodes 104 would be needed for the form to be completed.

In this example, the form to be completed may comprise any number of fields, such as a user's name, address, post code, date of birth, etc. The user may be expected to provide the data for completing the fields in any sequence in the speech input 102. A node 104 may be provided for each data type, or form field. The lexicons 618 of each node 104 are specific to the field. For example, the lexicon 618 for the post code node 104 may comprise all post codes in a relevant region. Using the insurance example mentioned above, the lexicon 618 of the name node 104 may comprise the names of those who are expected to make contact using some level of business intelligence, such as those sent an offer, due for renewal within a predefined number of day, etc. The name node 104 can be recompiled as set out above every day for example to ensure the lexicon 618 is relevant.

The speech input 102 is processed by the nodes 104 to extract the relevant data, and leaving a remnant with common phrases like "My address is", "And my date or birth is".

Completing a form using the user input 102 may similarly be used in the context of placing an order, for example a food order. A user may provide their name, address, post code, and order in a single speech input 102 in any sequence. Each node 104 is specific to the fields of name, address, post code, and menu, for example.

It will be appreciated that any context for which the contextual data drives the formation on narrow lanes of contextual understanding could be applied to the present recognition system 100. Another example of such data is events recently advertised or newsworthy.

The invention claimed is:

1. A computing system for determining a user intent from a speech input to effect a user intended action, the computer system comprising:
   a set of processing nodes, wherein each processing node is capable of understanding only a subset of words directly relevant to a particular context associated with that processing node, the processing nodes of the set being arranged to receive a same speech input, wherein each processing node is configured to attempt to interpret the same speech input based on the subset of words directly relevant to its associated context, to extract therefrom an output indicative of user intent, whereby each processing node is unable to interpret any portion of the same speech input containing a word outside of its subset of words, whereby a portion of the same speech input relating to the particular context of a first of the processing nodes is interpretable to the first processing node but is not interpretable to a second of the processing nodes, wherein each processing node comprises:
      an automated speech recognition component config- ured to generate a speech recognition result from the same speech input based on the subset of words understood by that processing node; and
      an intent recognition component configured to generate the output indicative of user intent based on the speech recognition result, wherein the speech recog- nition output is restricted to only any portion or portions of the same speech input that the automated speech recognition component was able to interpret; and
   a controller configured to receive the outputs from the set of processing nodes and determine a most likely user intent based on the outputs;
   wherein the controller comprises a further processing node, wherein the further processing node is capable of understanding only a subset of words derived from the outputs indicative of user intent of each of the process- ing nodes of the set of processing nodes, the further processing node being arranged to receive the same speech input, wherein the further processing node is configured to:
   attempt to interpret the same speech input based on the subset of words derived from the outputs indicative of user intent of each of the processing nodes; and
   provide an indication of a most relevant output indicative of user intent, the most relevant being the output indicative of user intent which is determined to be most likely to represent the speech input; and
   wherein the subset of words of the further processing node are selected based on the speech recognition results of each of the processing nodes of the set of processing nodes, wherein the further processing node comprises an automated speech recognition component and an intent recognition component, wherein the indi- cation of the most relevant output indicative of user intent generated by the further processing node com- prises a comparable confidence score, the comparable confidence score denoting an extent to which the speech recognition output generated by the intent rec- ognition component of the further processing node is relevant to the speech input.

2. The computing system of claim 1, wherein the output generated by each processing node comprises a confidence score denoting an extent to which the processing node was able to interpret the speech input, and thus conveying an expected relevance of an associated context of the process- ing node to the same speech input.

3. The computing system of claim 2, wherein the con- troller is configured to determine the most likely user intent by determining a significant confidence score of the received confidence scores.

4. The computing system according to claim 3, wherein the controller is configured to determine the significant confidence score based on the statistical significance of the received confidence scores.

5. The computing system of claim 4, wherein the con- troller is further configured to:
   identify a segment of the user input associated with the significant confidence score;
   remove the segment from the user input to generate a reduced user input;
   provide the reduced user input to the set of processing nodes;
   receive, from each of the processing nodes of the set of processing nodes, a second output generated by pro- cessing the reduced user input using the processing nodes;
   determining the user intent based on the outputs and the second outputs.

6. The computing system of claim 3, wherein the con- troller is further configured to:
   identify a second significant confidence score received from a second of the set of processing nodes;

determine that the significant confidence score and the second significant confidence score are associated with a same segment of the user input;

determine, based on a determined grammar of the user input, the most likely user intent, wherein the most likely user intent corresponds to a more likely determined grammar of the outputs comprises the significant confidence score and the second significant confidence score.

7. The computing system of claim 1, wherein the confidence score depends on:

the proportion of the speech input that the automated speech recognition component was not able to interpret; and a confidence of the automated speech recognition component in its interpretation of any portion that it was able to interpret.

8. The computing system of claim 1, wherein the subset of words is contained in a configurable lexicon of the automated speech recognition component.

9. The computing system of claim 1, wherein the controller is configured to determine the most likely user intent based on a highest comparable confidence score generated by the further processing node.

10. The computing system of claim 1, wherein the system further comprises:

a plurality of sets of processing nodes; and a plurality of instances of the controller, wherein each instance of the controller is associated with one of the sets of processing nodes;

wherein each controller is configured to receive outputs from each of the processing nodes of the associated set of processing node.

11. The computing system of claim 10, wherein each instance of the controller comprises a respective input, wherein each instance of the controller is configured to:

receive a respective user input; and provide the respective user input to the set of processing nodes associated with the controller.

12. The computing system of claim 1, wherein the system further comprises a central controller configured to:

receive and store in computer memory current contextual data associated with the context;

build a language library based on the current contextual data;

compile an updated processing node associated with the context based on the language library; and deploy the updated processing node at one of the set of processing nodes.

13. The computing system of claim 12, wherein at least a portion of the current contextual data is substantially the same as a portion of historic contextual data, wherein the language library is based on user inputs received associated with the portion of historic contextual data.

14. The computing system according to claim 12, wherein the central controller is configured to retire a former processing node associated with the context which is replace by the updated processing node.

15. The computing system of claim 12, wherein the central controller is configured to compile and deploy the updated processing node periodically.

16. The computing system of claim 1, wherein the controller is further configured to:

determine an action based on the user intent; and provide instructions which, when executed, cause the action to be implemented.

17. The computing system of claim 1, wherein the controller is associated with a service system, wherein the controller is executed on a computing device of the service system.

18. The computing system of claim 1, wherein each processing node is executed by a remote server or a virtual machine.

19. The computing system of claim 1, wherein each of the processing nodes, comprises:

a processing node of the computing system for determining the user intent from a speech input to effect the user intended action, wherein the processing node is capable of understanding only the subset of words directly relevant to the particular context associated with the processing node, wherein the processing node is configured to attempt to interpret the speech input based on the subset of words directly relevant to the associated context, to extract therefrom the output indicative of user intent, whereby each processing node is unable to interpret any portion of the same speech input containing a word outside of its subset of words, wherein the processing node comprises:

a voice-to-text component for generating a text string from the spoken user input, wherein the voice-to-text component is associated with a context lexicon comprising the subset of words directly relevant to the associated context, wherein the text string comprises only words comprised in the subset of words directly relevant to its associated context; and an intent recognition component configured to receive the text string and determine a contextual intent based on the text string and the context lexicon.

*  *  *  *  *